United States Patent
Claybrook et al.

(10) Patent No.: US 11,109,214 B1
(45) Date of Patent: Aug. 31, 2021

(54) DEVICE, SYSTEM AND METHOD FOR SERVING INTERFACES TO CLIENT ACCESS DEVICES BASED ON ASSIGNED ROLES

(71) Applicant: MOTOROLA SOLUTIONS, INC., Chicago, IL (US)

(72) Inventors: Samuel Claybrook, Chicago, IL (US); Jonathan Solomon, Chicago, IL (US); Joshua Smith, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/007,264

(22) Filed: Aug. 31, 2020

(51) Int. Cl.
*H04W 4/90* (2018.01)
*H04L 29/06* (2006.01)
*H04W 76/50* (2018.01)
*H04W 4/021* (2018.01)

(52) U.S. Cl.
CPC .............. *H04W 4/90* (2018.02); *H04L 63/08* (2013.01); *H04W 4/022* (2013.01); *H04W 76/50* (2018.02)

(58) Field of Classification Search
CPC ....... H04W 4/90; H04W 4/022; H04W 76/50; H04L 63/08
USPC ........................................................ 455/404
See application file for complete search history.

(56) References Cited

U.S. PATENT DOCUMENTS

| | | |
|---|---|---|
| 8,793,489 B2 | 7/2014 | Polunin |
| 10,367,821 B2 | 7/2019 | Ivanov |
| 2006/0276168 A1* | 12/2006 | Fuller, Jr. ............. H04W 76/50 455/404.2 |
| 2007/0274506 A1 | 11/2007 | Schundler |
| 2015/0278732 A1 | 10/2015 | Fiedler et al. |
| 2016/0330769 A1* | 11/2016 | Edge ..................... H04W 4/90 |
| 2018/0101923 A1 | 4/2018 | Griesmann et al. |

FOREIGN PATENT DOCUMENTS

| | | |
|---|---|---|
| KR | 100974229 B1 | 8/2010 |
| WO | 2008008055 A2 | 1/2008 |

* cited by examiner

*Primary Examiner* — Ted M Wang
(74) *Attorney, Agent, or Firm* — Perry + Currier, Inc.

(57) ABSTRACT

A device, system and method for serving interfaces to client access devices based on assigned roles is provided. A device detects an authentication of a PSAP user via a client access device and retrieves a PSAP load. The PSAP load may be a current and/or historical call-taking load, and/or a current and/or historical first-responder dispatching load. The device assigns, based on the PSAP load, a role to the PSAP user, the role comprising one of: a call-taking role; a first-responder-dispatching role; and a combined call-taking and first-responder-dispatching role. The device serves, to the client access device, based on the role assigned to the PSAP user, a corresponding interface to one of: a call-taking application; a first-responder-dispatching application; and a combined call-taking and first-responder-dispatching application.

20 Claims, 6 Drawing Sheets

FIG. 8

DEVICE, SYSTEM AND METHOD FOR SERVING INTERFACES TO CLIENT ACCESS DEVICES BASED ON ASSIGNED ROLES

BACKGROUND OF THE INVENTION

At public safety answering point (PSAP) systems, when a natural disaster and/or major crisis event happens, and/or when a shift change occurs, PSAP users that use client access devices to log into a PSAP system may be permanently assigned a static role (e.g., such as call-taking, dispatching and the like). However, incorrect or unbalanced role levels may lead to issues in call-taking, dispatching and/or may generally adversely affect the load on a PSAP system. Furthermore, during natural disasters and/or major crises, more of one type of role may be required over others, among other issues.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

At public safety answering point (PSAP) systems, when a natural disaster and/or major crisis event happens, and/or when a shift change occurs, PSAP users that use client access devices to log into a PSAP system may be permanently assigned a static role (e.g., such as call-taking, dispatching and the like). However, incorrect or unbalanced role levels may lead to issues in call-taking, dispatching and/or may generally adversely affect the load on a PSAP system. Furthermore, during natural disasters and/or major crises, more of one type of role may be required over others, among other issues.

Hence, provided herein is a device, system and method for serving interfaces to client access devices based, for example on roles assigned to PSAP users of the client access devices by a PSAP server. For example, a PSAP user may use a client access device (e.g., an off-premises computing device, an on-premises PSAP terminal, and the like, which may be configured and/or used as a client of a PSAP system) to log into a PSAP system via a PSAP server, and/or another suitable component of the PSAP system, and the like. Such a login, which generally includes an authentication of a PSAP user, may occur at a shift change and/or at any suitable time, for example when the PSAP user is notified to log in via an email, a text message, and the like, from a supervisor due to high demand on the PSAP system. Similarly, such a log in may occur following a natural disaster and/or public safety incident, and the like, and the PSAP user proactively logs in into the PSAP system. The PSAP server generally determines a current and/or historical load on the PSAP system, and assigns a role to the PSAP user based on the load. Such current and/or historical load may include, but is not limited to, a volume of calls and/or communications with first responders, but may also include information such as incident types being reported and/or to which first responders are dispatched, and the like. The role assignment may be further based on a skill of the PSAP user as stored at a memory, hardware resources available to the PSAP user, as stored at the memory, and the like. Such a role may include, but is not limited to, a call-taking role, a first-responder dispatching role and/or a combination thereof. Such skills may also be based on experience with various incident types (e.g., including relative to incident types of the determined load). Based on the assigned role, the PSAP server serves, to the client access device, a corresponding interface for one of a call-taking application; a first-responder-dispatching application; and a combined call-taking and first-responder-dispatching application. For example, such applications may be implemented by the PSAP system, and the client access device may use the served interface to access and/or interact with the corresponding application such that the PSAP user may perform their assigned role. Such assignment of roles and serving of interfaces may further be used to load-balance the PSAP system, such that the PSAP user is assigned a role (and a respective client access device is served a respective interface) that is appropriate for a given load at the PSAP system (e.g., current load and/or historical load) such that there are not too many PSAP users assigned to one role when there is a deficit of PSAP users assigned to another role.

An aspect of the present specification provides a method comprising: detecting, at a public safety answering point (PSAP) server, an authentication of a PSAP user via a client access device; retrieving, by the PSAP server, a PSAP load comprising one or more of: a current PSAP call-taking load and a current PSAP first-responder-dispatching load; and an historical PSAP call-taking load and an historical PSAP first-responder-dispatching load; assigning, by the PSAP server, based on the PSAP load, a role to the PSAP user, the role comprising one of: a call-taking role; a first-responder-dispatching role; and a combined call-taking and first-responder-dispatching role; and serving, by the PSAP server, to the client access device, based on the role assigned to the PSAP user, a corresponding interface to one of: a call-taking application; a first-responder-dispatching application; and a combined call-taking and first-responder-dispatching application.

Another aspect of the present specification provides a device comprising: a communication unit; a controller having access to one or more memories, the controller configured to: detect an authentication of a PSAP user via a client access device; retrieve a PSAP load comprising one or more of: a current PSAP call-taking load and a current PSAP first-responder-dispatching load; and an historical PSAP call-taking load and an historical PSAP first-responder-dispatching load, as stored at the one or more memories; assign, based on the PSAP load, a role to the PSAP user, the role comprising one of: a call-taking role; a first-responder-dispatching role; and a combined call-taking and first-responder-dispatching role; and serve, via the communication unit, to the client access device, based on the role assigned to the PSAP user, a corresponding interface to one of: a call-taking application; a first-responder-dispatching application; and a combined call-taking and first-responder-dispatching application.

Figure 1:
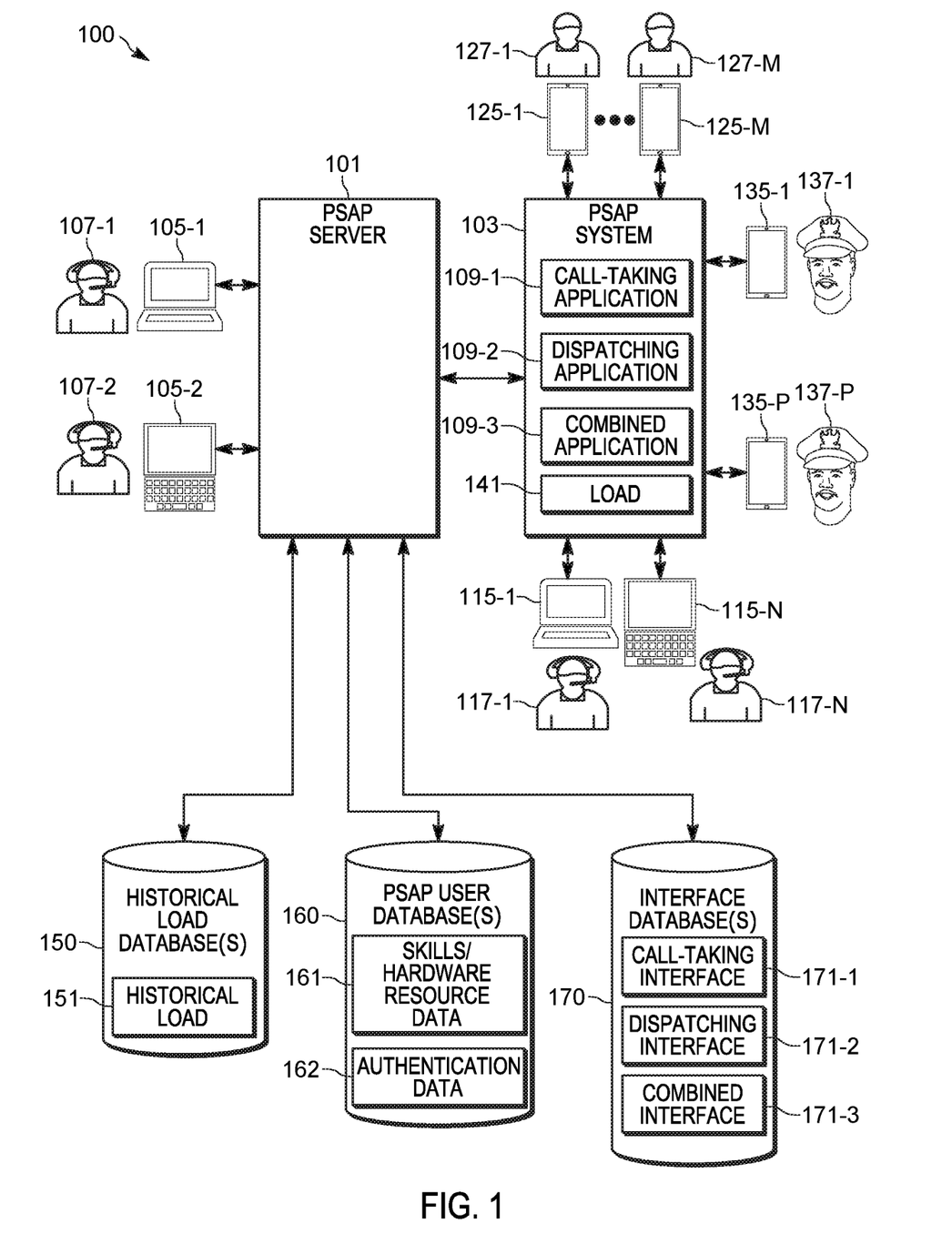
FIG. 1 is a system for serving interfaces to client access devices based on assigned roles, in accordance with some examples.

Attention is directed to FIG. 1, which depicts an example system 100 for serving interfaces to client access devices based on assigned roles. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like.

The system 100 comprises a PSAP server 101, which may generally be configured as a login server, amongst other possibilities, to a PSAP system 103. For example, as depicted, two client access devices 105-1, 105-2, respectively operated by PSAP users 107-1, 107-2, may be logging into the PSAP system 103 via respective communication links. While depicted separately from the PSAP system 103, the PSAP server 101 may be a component of the PSAP system 103, as described in more detail below.

The client access devices 105-1, 105-2 are interchangeably referred to hereafter, collectively, as the client access devices 105 and, generically, as a client access device 105. This numbering convention will be used throughout the present specification. For example, PSAP users 107-1, 107-2 are interchangeably referred to hereafter, collectively, as the PSAP users 107 and, generically, as a PSAP user 107.

Furthermore, while two client access devices 105 are depicted as logging into the PSAP system 103, the system 100 may comprise as few as one client access device 105 logging into the PSAP system 103, or more than two client access devices 105 logging into the PSAP system 103.

As depicted, the client access device 105-1 comprises a laptop computer, and the like, and may be located "off-premises" from the PSAP system 103, for example at a home of the PSAP user 107-1, and the like. In contrast, the client access device 105-2 comprises a terminal, and the like, and may be located "on-premises" to the PSAP system 103, for example at a PSAP call center, and the like. Hence, the PSAP user 107-1 may be working from home, while the PSAP user 107-2 may be working at a PSAP call center. Hence, in general, the PSAP users 107 may be employees of an entity operating the PSAP system 103, and/or volunteers of the entity operating the PSAP system 103, and the like. Such an entity may comprise a police services entity and/or a 911 call center entity, and the like for a jurisdiction such as a county, a city, a state, and the like.

The client access devices 105 generally comprise respective suitable combinations of processors, memories, network devices, transceivers, input devices (e.g., keyboards, pointing devices, and the like) and display screens, and/or other output devices, and the like. As such the client access device 105 may have different hardware resources available (e.g., processors of computing power, different network devices (e.g., a long term evolution (LTE) or a 5G transceiver), and the like), Regardless, the client access devices 105 are generally configured to implement interfaces to applications at the PSAP system 103, for example by providing such interfaces at display screens thereof, as described in more detail below.

Furthermore, the client access devices 105 are generally configured to login to the PSAP system 103, for example via the PSAP server 101 and/or another suitable component of the PSAP system 103. Such a login generally includes an authentication of a PSAP user 107 and/or a respective client access device 105. For example, the client access devices 105 may include a stand-alone application for logging into the PSAP system 103 and/or authenticating with the PSAP system 103, and/or the client access devices 105 may include a browser application for retrieving a login and/or authentication webpage from suitable components of the PSAP system 103.

Regardless, such logging in and/or authentication may include a PSAP user 107 providing identifiers and/or credentials for logging in and/or authentication, such as employee numbers, passwords, and the like, and may further include any suitable two-factor authentication, and the like (e.g., the PSAP server 101 and/or another component of the PSAP system 103 may text a code to a phone number, and the like, of a PSAP user 107 that has been registered with the PSAP server 101 and/or another component of the PSAP system 103).

While not depicted, the PSAP system 103 may comprise any suitable combination of servers, computing devices, cloud-computing devices, call-answering devices, call-queuing devices, radios, and the like, for performing the above described functionality. While the PSAP server 101 is depicted as separate from the PSAP system 103, the PSAP server 101 may comprise a component of the PSAP system 103 and, in addition to functionality described herein with respect to logging in and/or assigning roles and/or serving interfaces to the client access devices 105, the PSAP server 101 may perform a portion of functionality of the PSAP system 103 as next described.

In general, the PSAP system 103 may be configured to implement various applications 109-1, 109-2, 109-3 (e.g., applications 109 and/or an application 109) including, but not limited to, a call-taking application 109-1, a first-responder dispatching application 109-2 and a combined call-taking and first-responder-dispatching application 109-3, amongst other possibilities, including but not limited to real-time aware applications, analytics applications, location applications, and/or video operator applications, record and evidence agent applications, and the like.

In particular, the PSAP system 103 may be in communication with an integer number "N" of client access devices 115-1, . . . 115-N (e.g., client access devices 115 and/or a client access device 115), similar to the client access devices 105, but logged into the PSAP system 103. The client access devices 115 may be operated by respective PSAP users 117-1, . . . 117-N (e.g., PSAP users 117 and/or a PSAP user 117), similar to the PSAP users 107. The system 100 may comprise any suitable number "N" of client access devices 115 and PSAP users 117, including, but not limited to, as few as one client access device 115 and one PSAP user 117, and/or a plurality of client access devices 115 and PSAP users 117. The number of client access devices 115 and PSAP users 117 may depend on how many client access devices 115 and PSAP users 117 are logged into the PSAP system 103 at any given time and may change as PSAP users 117 log in and out of the PSAP system 103.

In general, it is understood that the client access devices 105 and the PSAP users 107 may be similar to the client access devices 115 and the PSAP users 117, however, initially, the PSAP users 117 are understood to be already authenticated PSAP users, and the PSAP users 107 have not yet been authenticated. However, when a PSAP user 107 is authenticated, and for example a respective client access device 105 is logged into the PSAP system 103, the respective client access device 105 of an authenticated PSAP user 107 performs similar functionality to a client access device 115 as described hereafter.

Hereafter, reference will be made to available and unavailable client access devices 115. As understood herein, an available client access device 115 may comprise a client access device 115, which is not presently engaged in a call (e.g., with a caller and/or a first responder), and which hence may be used to answer a call and/or communicate with a first responder. Conversely, an unavailable client access device 115 may comprise a client access device 115, which is presently engaged in a call (e.g., with a caller and/or a first responder), and which hence may not be used to answer a call and/or communicate with a first responder.

In general, the client access devices 115 may be used by the PSAP users 117 to interact with the applications 109, depending on an assigned role (e.g., which may be assigned by the PSAP server 101, described below).

For example, a subset of the PSAP users 117 may be assigned a call-taking role. When communication devices 125-1, . . . 125-M (e.g., communication devices 125 and/or a communication device 125) are used by respective callers 127-1, . . . 127-M (e.g., callers 127 and/or a caller 127) to call the PSAP system 103 (e.g., via an emergency 911 call and the like), for example to report a public-safety incident, and the like, a communication device 125 may be connected to a respective client access device 115 operated by a respective call-taking PSAP user 117, such that a respective caller 127 may speak with the respective call-taking PSAP user 117.

In these examples, a respective client access device 115 may interact with the call-taking application 109-1, for example via a call-taking interface (described in more detail below) at the respective client access device 115 to answer calls, generate incident reports and the like.

An integer number "M" of communication devices 125 and callers 127 may vary with time as calls are answered and/or ended, and may include, but is not limited to, as few as one communication device 125 and caller 127, or a plurality of communication devices 125 and callers 127. Furthermore, when there are more communication devices 125 calling the PSAP system 103 than there are available client access devices 115 operated by call-taking PSAP users 117, calls from the communication devices 125 may be placed in a queue.

As depicted, the communication devices 125 comprise mobile devices, but the communication devices 125 may comprise any suitable communication devices for making a call to the PSAP system 103 including, but not limited to, the depicted mobile devices, public switched telephone network (PSTN) telephones, laptops, personal computers, and the like. Furthermore, calls to the PSAP system 103 may occur via any suitable combination of wireless and/or wired networks and may include, but are not limited to, mobile phone calls, PSTN calls, Internet Protocol (IP) calls, calls made using applications, and the like.

Similarly, another subset of the PSAP users 117 may be assigned a first-responder dispatching role. Respective client access devices 115 operated by the PSAP users 117 assigned such a dispatching role may be used to communicate with communication devices 135-1, . . . 135-P (e.g., communication devices 135 and/or a communication device 135), operated by first responders used by respective first responders 137-1, . . . 137-P (e.g., first responders 137 and/or a first responder 137). For example, respective client access devices 115 operated by the dispatching PSAP users 117 may be used to communicate with a communication device 135 to dispatch a respective first responder 137 to a public-safety incident (e.g., as reported by a caller 127, and/or one of the first responders 137, and the like).

In these examples, a respective client access device 115 may interact with the first-responder dispatching application 109-2, for example via a first-responder dispatching interface (described in more detail below) at the respective client access device 115 to one or more of communicate with the communication devices 135, dispatch the first responders 137, and the like.

An integer number "P" of communication devices 135 and first responders 137 may vary with time as first responders 137 start and/or end shifts and/or are dispatched and/or become available and/or unavailable to respond to incidents. Furthermore, while the depicted first responders 137 are police officers, the first responders 137 may comprise any suitable first responders including, but not limited to, fire fighters, emergency medical technicians, and the like.

As depicted, the communication devices 135 comprise mobile devices, but the communication devices 135 may comprise any suitable communication devices that may be used by first responders for communicating with the PSAP system 103 including, but not limited to, the depicted mobile devices, public switched telephone network (PSTN) telephones, laptops, personal computers, radios, vehicle radios, talkgroup enabled communication devices, remote-speaker microphones, and the like. Furthermore, communications between the PSAP system 103 (e.g., and the client access devices 115) may occur via any suitable combination of wireless and/or wired networks and may include, but are not limited to, mobile phone calls, PSTN calls, Internet Protocol (IP) calls, calls made using applications, talkgroup calls, and the like.

In yet further examples, yet another subset of the PSAP users 117 may be assigned a combined call-taking and dispatching role such that respective client access devices 115 may be used to communicate with the communication devices 125, 135 to perform both call-taking and dispatching. In these examples, a respective client access device 115 may interact with the combined call-taking and first-responder-dispatching application 109-3, for example via a combined call-taking and first-responder-dispatching interface (described in more detail below). As mentioned earlier, other types of applications 109 may be implemented that may interact with any combination of devices and/or users set forth above.

As has already been mentioned, while the PSAP server 101 is depicted as separate from the PSAP system 103, the PSAP server 101 may comprise a component of the PSAP system 103 and may perform a portion of functionality of the PSAP system 103; for example, a portion of the client access devices 115, and/or the communication devices 125, 135 may be communication with the PSAP system 103 via the PSAP server 101.

As will next be described, the PSAP users 107 operate the client access devices 105 to communicate with the PSAP server 101, and/or another suitable component of the PSAP system 103, to log into and/or authenticate with the PSAP system 100. As the PSAP server 101 detects authentication of a PSAP user 107, the PSAP server 101 generally assigns respective roles to the PSAP users 107 (e.g., such roles being similar to as described above with respect to the PSAP users 117). Role assignment by the PSAP server 101 is generally based on a current PSAP call-taking load and a current PSAP first responder dispatching load, and/or an historical PSAP call-taking load and an historical PSAP first-responder-dispatching load. When a role is assigned to a PSAP user 107, the PSAP server 101 serves (e.g., transmits) respective interfaces to respective client access devices 105 based on the assigned role.

For example, as depicted, a current load 141 (e.g., a current PSAP call-taking load and a current PSAP first responder dispatching load) on the PSAP system 103 is depicted, which may vary as a number of calls by the communication devices 125 to the PSAP system 103 vary, and/or as a number of communications with the communication devices 135 vary. For example, the current load 141 may comprise any suitable measurements and/or metrics, which represents available resources and/or unavailable (e.g., in-use) resources at the PSAP system 103 representative of a current PSAP call-taking load and a current PSAP first responder dispatching load including, but not limited to, a number of current calls by the communication devices 125, a number of the current calls by the communication devices 125 that have been answered by a client access device 115, a number of the current calls by the communication devices 125 that are in a queue, a number of current communications with the communication devices 135 by the client access devices 115, current roles assigned to the various PSAP users 117, current available client access devices 115, current unavailable client access devices 115, ratios between two or more of the foregoing, and the like. The current load 141 may be determined on an on-going basis by suitable components of the PSAP system 103 and/or upon request by the PSAP server 101, and the like. Furthermore, such current load may be categorized based on incident type, and the like and/or a PSAP user 117 who is handling various incident types. For example, calls from the communication devices 125 may be categorized by incident type (e.g., by the PSAP users 117, and the like) and the calls from the communication devices 125 and/or communications with the communication devices 135 (e.g., to dispatch first responders 137 to incidents reported via calls from the communication devices 125) may be categorized by incident type (e.g., accidents, security checks, crowd control, fire, burglary, etc.), as well as by which PSAP user 117 is handling given incident types.

As depicted, the system 100 further comprises a memory 150, provided in the form of one or more historical load databases, which stores historical load 151 of the PSAP system 103, for example as a function of time, date, incident type, PSAP user 107, 117 who handled various historic calls and/or incident types, and the like. The historical load 151 may comprise similar measurements and/or metrics as the current load 141, but is representative of an historical PSAP call-taking load and an historical PSAP first-responder-dispatching load. As the current load 141 changes, the PSAP server 101 (and/or another suitable device of the PSAP system 103) may update the historical load 151, for example periodically, on a real-time basis, and the like.

In some examples, the historical load 151 (e.g., the historical PSAP call-taking load and the historical first-responder-dispatching load) may comprise respective historical averages over a plurality of prior measurements at one or more of: a local PSAP system, such as the PSAP system 103; and a remote PSAP system that shares attributes with the local PSAP system. For example, the historical load 151 may alternatively be at least partly maintained by an historical load server (not depicted), and the like, that may communicate with a plurality of PSAP systems, such as the PSAP system 103 and PSAP systems maintained by other entities of jurisdictions that may be of a similar size and/or similar demographic (e.g., and/or any other shared attribute) as the jurisdiction of the entity that is maintaining the PSAP system 103. Hence, for example, such an historical load server may communicate with the plurality of PSAP systems and update the historical load 151 to show an average historical load over the plurality of PSAP systems as a function of time, and the like. Such an historical load server may be provided as part of a cloud-based service for providing PSAP services, and the like, across a plurality of jurisdictions.

Regardless, it is understood that the PSAP server 101 may communicate with suitable components of the PSAP system 103 to determine and/or retrieve the current load 141 and/or the PSAP server 101 may retrieve the historical load 151 from the memory 150, and that one or more of the loads 141, 151 is used by the PSAP server 101 to assign a role to a PSAP user 107.

Furthermore the PSAP users 107 may have different skill sets. For example, a given PSAP user 107 may have more experience in call-taking than dispatching, or vice versa. Similarly, a given PSAP user 107 may have more experience with different situations of the PSAP system 103, for example in a disaster recovery mode vs. normal operation, and the like. Similarly, a given PSAP user 107 may have more experience and/or skills with certain incident types. Furthermore, as described above the respective client access devices 105 may have different hardware resources that may cause one client access device 105 to be more suitable for use in performing different assigned roles, than another client access device 105; for example, a 5G transceiver may be more suitable for dispatching due to increased reliability of 5G as compared to LTE, and/or due to use of 5G in a first responder network that may be used by the communication devices 135 of the first responders 137 but not the communication devices 125 of the callers 127, and the like.

Hence, as depicted, the system 100 further comprises a memory 160, provided in the form of one or more PSAP user databases employee, which stores data 161 indicative skills of the PSAP users 107 and/or hardware resources of respective client access devices 105, (e.g., which may include skills of the PSAP users 117 and/or hardware resources of respective client access devices 115). While not depicted, it is understood that the data 161 may include identifiers (e.g., employee numbers) of the PSAP users 107 and/or respective client access devices 105 (e.g., Internet Protocol (IP) addresses and/or Media Access Control (MAC) addresses, and the like) stored in association with respective skills and hardware resources. It is understood, however, that the current load 141 and/or the historical load 151 may also be indicative of skills of the PSAP users 107, for example as the current load 141 and/or the historical load 151 may indicate skills of the PSAP users 107 in handling different incident types; as such, in some examples, the data 161 may be updated based on the current load 141 and/or the historical load 151.

It is understood that the PSAP server 101 may optionally retrieve the data 161 from the memory 160 when assigning a role to a PSAP user 107.

As depicted, the memory 160 further stores authentication data 162, which may include passwords, and/or any other suitable authentication data, stored in association with include identifiers (e.g., employee numbers) of the PSAP users 107 (e.g., and the PSAP users 117) and/or the respective client access devices 105 (e.g., and the client access devices 115), and the like. The authentication data 162 for a particular PSAP user 107, and the like, may be populated in an enrollment process and updated as the particular PSAP user 107 changes their password, and/or any other suitable authentication data. In some examples, the data 161, 162 may be combined, for example in respective employee and/or volunteer records. Such employee and/or volunteer records may further include other suitable information, such as a location and/or home address of a PSAP user 107, 117 and/or a location of a respective client access device 105, 115.

It is understood that the PSAP server 101, and/or any other suitable component of the PSAP system 103, may retrieve the authentication data 162 from the memory 160 when authenticating a PSAP user 107 and/or a respective client access device 105, for example in a login process.

As depicted, the system 100 further comprises a memory 170 in the form of one or more interface databases, which stores respective interfaces 171-1, 171-2, 171-3 (e.g., interfaces 171 and/or an interface 171) for the call-taking application 109-1, the dispatching application 109-2 and the combined call-taking and dispatching application 109-3, amongst other possibilities, including but not limited to real-time aware applications, analytics applications, location applications, and/or video operator applications, record and evidence agent applications, and the like.

For example, the call-taking interface 171-1 is generally to interface with the call-taking application 109-1, and may include one or more of: a mechanism for answering emergency 911 call and/or calls from the communication devices 125; and a data entry mechanism for generating new incidents. For example, the call-taking interface 171-1 may include electronic soft buttons for answering emergency 911 call and/or calls from the communication devices 125, generating new incidents and/or incident files and/or incident reports, and the like.

Similarly, the dispatching interface 171-2 is generally to interact with the dispatching application 109-2, and may include one or more of: a radio console interface for contacting the first responders 137 (e.g., via the communication devices 135); and a map application for identifying locations of one or more of the first responders 137 and the callers 127 to the PSAP system 103. For example, the dispatching interface 171-2 may include electronic soft buttons for controlling the radio console interface and/or for dispatching first responders 137 to an incident, and the like as well as map showing respective locations of one or more of the first responders 137.

Similarly, the combined interface 171-3 is generally to interact with the combined application 109-3, and may include one or more of: a mechanism for answering emergency 911 calls; and a data entry mechanism for generating new incidents; and one or more of: a radio console interface for contacting first responders; and a map application for identifying locations of one or more of the first responders 137 and the callers 127 to the PSAP system 103. For example, the combined interface 171-3 may comprise similar electronic soft buttons and/or mechanisms and/or radio console interfaces and/or map applications, and the like, as the interfaces 171-1, 171-2.

The interfaces 171 are provided in any suitable format including, but not limited to, stand-alone applications, which may be implemented by respective client access devices 105, web pages, which may be provided at a browser application implemented by respective client access devices 105, and the like. Simple examples of the interfaces 171 are described below with respect to FIG. 6, FIG. 7 and FIG. 8.

While the memories 150, 160, 170 are depicted as being separate from each other, and separate from the PSAP server 101, two or more of the memories 150, 160, 170 may be combined and/or one or more of the memories 150, 160, 170 may comprise a portion of a memory of the PSAP server 101. Furthermore, in some examples, local copies of the interfaces 171 may be stored at a respective memory of the client access devices 105 (e.g. and/or the memory 170 may be a component of a client access device 105 and/or similar memories may be components of respective client access devices 105).

Furthermore, while not depicted, one or more of the memories 150, 160, 170 may further store "third party" data such as data collected by first responder entities, and/or other entity types, different from a PSAP entity, that may influence load at the PSAP system 103; such data may include, but is not limited to, traffic data, disaster data (e.g., earthquake data, fire data, and the like), weather data, and the like. Alternatively, the PSAP server 101 may have access to such third party data and/or third party servers storing such data (e.g., via any suitable network). In some examples, third party data may also be used to assign roles to the PSAP users 107 and/or to predict load at the PSAP system 103.

Regardless, when a given PSAP user 107 operates a respective client access device 105 to login to the PSAP system 103, the PSAP server 101 assigns a role to the given PSAP user 107, retrieves a corresponding interface 171 from the memory 170, and serves (e.g., transmits) the respective interface 171 to the client access device 105.

Figure 2:
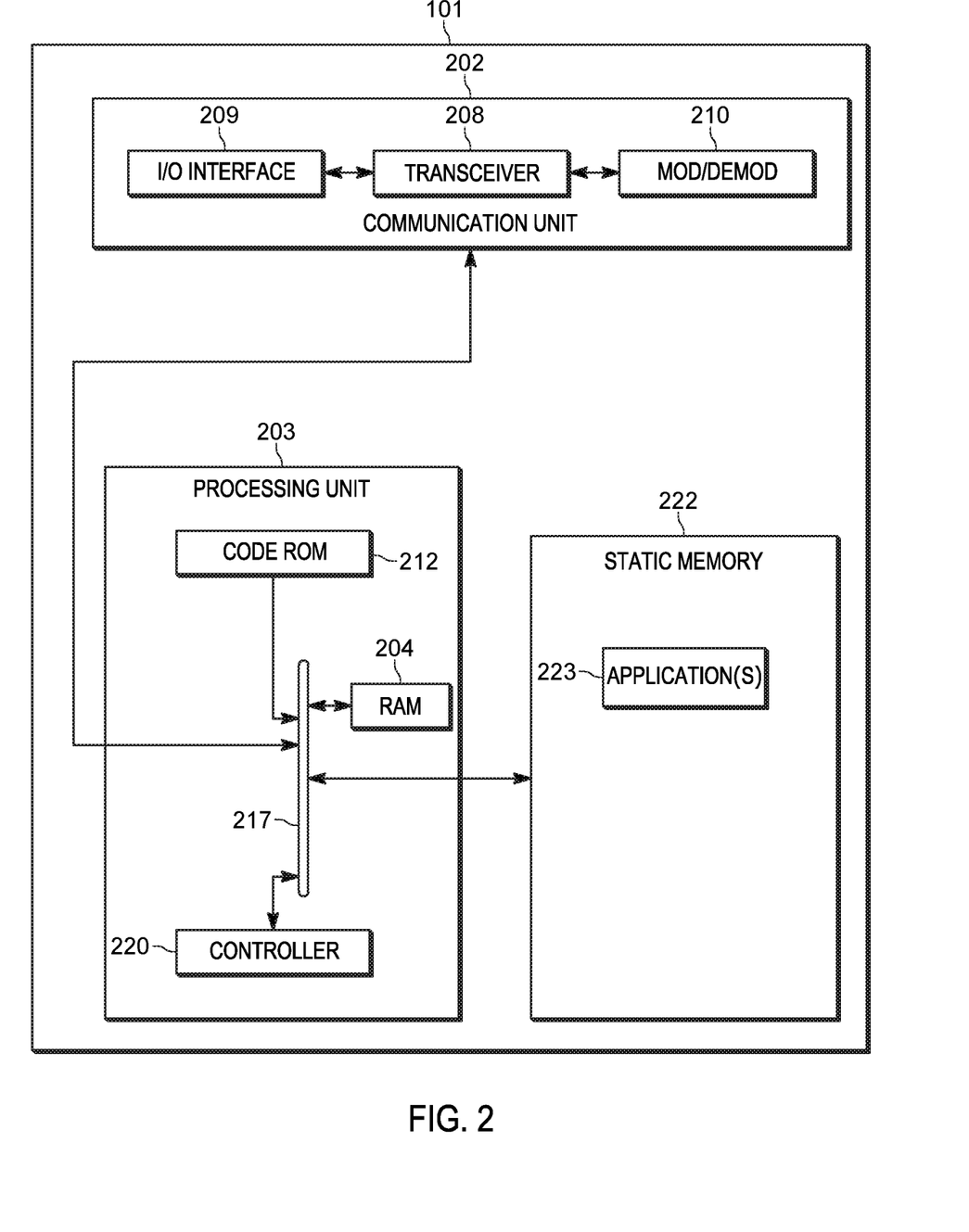
FIG. 2 is a device diagram showing a device structure of computing device for serving interfaces to client access devices based on assigned roles, in accordance with some examples.

Attention is next directed to FIG. 2, which depicts a schematic block diagram of an example of the PSAP server 101. In general, the PSAP server 101 may comprise one or more servers and/or one or more cloud computing devices, and the like, configured to communicate with the client access devices 105 and/or any other suitable component of the system 100. However, the PSAP server 101 may comprise a computing device such as a personal computer and/or a laptop computer, and the like. The PSAP server 101 may be located at a PSAP and/or with other components of the PSAP system 103, and the like, and/or remote from a PSAP and/or remote from other components of the PSAP system 103, and the like. Similarly, the PSAP server 101 may be located at a same facility (e.g., a PSAP) as the client access device 105-2 (and/or other terminals of the PSAP system 103 including, but not limited to, terminals of the client access devices 115), and the like, and/or the PSAP server 101 (e.g. on-premises, or in the cloud) and the client access device 105-2 may be remote from each other.

As depicted, the PSAP server 101 comprises: a communication unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223.

While not depicted, the PSAP server 101 may include one or more of an input device and a display screen and the like, a microphone (e.g., to receive voice commands) such that a user (e.g., an administrator of the system 100 and/or the PSAP system 103), may interact with the PSAP server 101.

As shown in FIG. 2, the PSAP server 101 includes the communication unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 that are configurable to communicate with the client access devices 105 and/or any other suitable component of the system 100. For example, the communication unit 202 may include one or more transceivers 208 and/or wireless transceivers for communicating with the client access devices 105 and/or any other suitable component of the system 100. Hence, the one or more transceivers 208 may be adapted for communication with one or more communication networks used to communicate with the client access devices 105 and/or any other suitable component of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g., hardware ports) for coupling to other hardware components.

The controller 220 may include one or more logic circuits, one or more processors, one or more microprocessors, and/or the controller 220 may include one or more ASIC (application-specific integrated circuits) and one or more FPGA (field-programmable gate arrays), and/or another electronic device. In some examples, the controller 220 and/or the PSAP server 101 is not a generic controller and/or a generic device, but a device specifically configured to implement functionality for serving interfaces to client access devices based on assigned roles. For example, in some examples, the PSAP server 101 and/or the controller 220 specifically comprises a computer executable engine configured to implement functionality for serving interfaces to client access devices based on assigned roles.

The static memory 222 is a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functional teachings of the PSAP server 101 as described herein are maintained, persistently, at the memory 222 and used by the controller 220, which makes appropriate utilization of volatile storage during the execution of such programming instructions.

Figure 3:
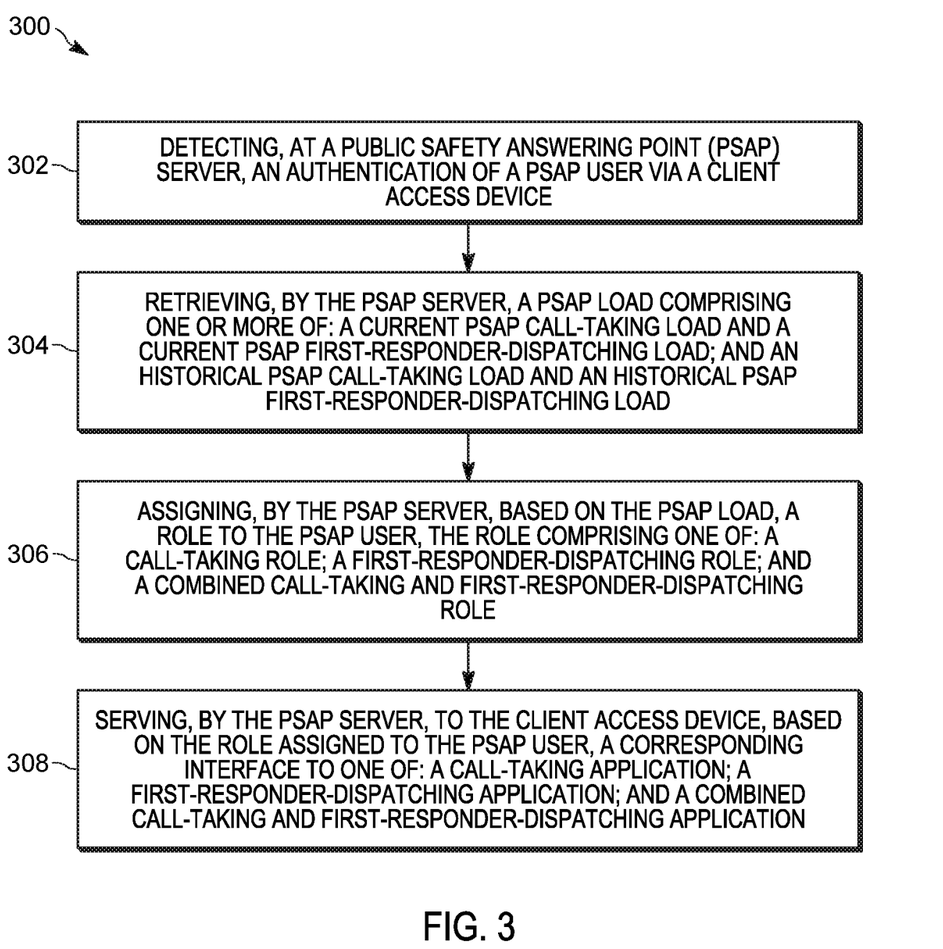
FIG. 3 is a flowchart of a method for serving interfaces to client access devices based on assigned roles, in accordance with some examples.

In particular, the memory 222 stores instructions corresponding to the at least one application 223 that, when executed by the controller 220, enables the controller 220 to implement functionality described herein including, but not limited to, the blocks of the method set forth in FIG. 3.

While not depicted, the memory 222 may further include one or more of the memories 150, 160, 170 and/or the memory 222 may store one or more of the historical load 151, the data 161, the authentication data 162, and/or the interfaces 171.

In illustrated examples, when the controller 220 executes the one or more applications 223, the controller 220 is enabled to: detect an authentication of a PSAP user via a client access device; retrieve a PSAP load comprising one or more of: a current PSAP call-taking load and a current PSAP first-responder-dispatching load; and an historical PSAP call-taking load and an historical PSAP first-responder-dispatching load; assign, based on the PSAP load, a role to the PSAP user, the role comprising one of: a call-taking role; a first-responder-dispatching role; and a combined call-taking and first-responder-dispatching role; and serve, to the client access device, based on the role assigned to the PSAP user, a corresponding interface to one of: a call-taking application; a first-responder-dispatching application; and a combined call-taking and first-responder-dispatching application.

The application 223 may include numerical algorithms configured to assign, a role to a PSAP user based on a PSAP load, and/or any other suitable functionality of the PSAP server 101.

Alternatively, and/or in addition to numerical algorithms, the application 223 may include machine learning models and/or algorithms, and the like, which have been trained to assign a role to a PSAP user based on a PSAP load, and/or any other suitable functionality of the PSAP server 101. The one or more machine learning models and/or algorithms of the application 223 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety environments, such as at a PSAP. Any suitable machine learning algorithm and/or deep learning algorithm and/or neural network is within the scope of present examples.

While details of the client access devices 105, 115 and the communication devices 125, 135 are not depicted, the client access devices 105, 115 and the communication devices 125, 135 may have components similar to the PSAP server 101 adapted, however, for the functionality of the client access devices 105, 115 and the communication devices 125, 135. For example, the client access devices 105, 115 may include respective display screens for providing the interfaces 171, speakers, microphones, location determining devices (e.g., GPS devices), and the like.

Attention is now directed to FIG. 3, which depicts a flowchart representative of a method 300 for serving interfaces to client access devices based on assigned roles. The operations of the method 300 of FIG. 3 correspond to machine readable instructions that are executed by the PSAP server 101, and specifically the controller 220 of the PSAP server 101. In the illustrated example, the instructions represented by the blocks of FIG. 3 are stored at the memory 222 for example, as the application 223. The method 300 of FIG. 3 is one way that the controller 220 and/or the PSAP server 101 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 and/or the PSAP server 101 detects an authentication of a PSAP user 107 via a client access device 105.

For example, a PSAP user 107 may operate a respective client access device 105 to login to the PSAP system 103 via the PSAP server 101 and/or another suitable component of the PSAP system 103. Such a login may include the PSAP user 107 providing an identifier and authentication data, such as a password, and the like, in a stand-alone application and/or via a webpage in a browser application, as described above. The identifier and authentication data may be compared against the authentication data 162 to authenticate the PSAP user 107 (and/or a respective client access device 105). Such a login and/or authentication may further include the client access device 105 providing a network address to the PSAP server 101 and/or another suitable component of the PSAP system 103.

In examples where the PSAP server 101 (e.g., and/or the controller 220) performs the authentication, the controller 220 and/or the PSAP server 101 may detect the authentication of a PSAP user 107 via a client access device 105 by performing the authentication. In examples where another component of the PSAP system 103 performs the authentication, the controller 220 and/or the PSAP server 101 may detect the authentication of a PSAP user 107 via a client access device 105 by communicating with the component of the PSAP system 103 that performs the authentication and/or by the component of the PSAP system 103 that performs the authentication providing the PSAP server 101 with an indication of the authentication, and the like.

While such authentication is described throughout the present specification in the context of a login process, it is understood that such authentication may occur in other contexts, including, but not limited to, after a login process (e.g., a reauthentication) and the like. Alternatively, a PSAP user 107 may have already logged into the PSAP system 103 and may operate a respective client access device 105 to request a role assignment, which may cause an authentication for role assignment to occur and/or reoccur; in these examples, credentials specific to role assignments may be stored at the authentication data 162 (e.g., which may different from login credentials).

At a block 304, the controller 220 and/or the PSAP server 101 retrieves a PSAP load comprising one or more of: a current PSAP call-taking load and a current PSAP first-responder-dispatching load; and an historical PSAP call-taking load and an historical PSAP first-responder-dispatching load. For example, the current PSAP call-taking load and a current PSAP first-responder-dispatching load may be retrieved by querying suitable components of the PSAP system 103 to retrieve the current load 141. Similarly, the historical PSAP call-taking load and the historical PSAP first-responder-dispatching load may be determined by retrieving the historical load 151 from the memory 150.

Whether the current load 141 or the historical load 151, or both, are retrieved may depend on one or more of a location of the client access device 105 that has been authenticated at the block 302, whether the PSAP system 103 is on-line, off-line and/or has entered a disaster recovery mode amongst other possibilities.

For example, when a client access device 105, such as the client access device 105-2, is located at an on-premises PSAP location, retrieving the PSAP load may comprise retrieving the current load 141 (e.g., retrieving the current PSAP call-taking load and the current PSAP first-responder-dispatching load). In particular, in these examples, the PSAP user 107-2 may be assigned a role in the context of using a terminal at an on-premises PSAP location (e.g., the PSAP client access device 105) to login during "normal" operation of the PSAP system 103. As such, the current load 141 may be used to assign a role to the PSAP user 107-2.

Put another way, a client access device 105 may be located at an on-premises PSAP location, and retrieving the PSAP load, at the block 304, may comprise retrieving the current PSAP call-taking load and the current PSAP first-responder-dispatching load, for example by retrieving the current load 141 from suitable components of the PSAP system 103. However, such examples may further comprise retrieving the historical load 151 from the memory 150 and/or retrieving both the current load 141 and the historical load 151.

Similarly, when a client access device 105, such as the client access device 105-1, is located at an off-premises PSAP location, retrieving the PSAP load may comprise retrieving the historical load 151 from the memory 150, for example to reduce latency during login that may be introduced by retrieving the current load 141 as remote, off-premises logins may inherently introduce latency into a login process. In particular, in these examples, the PSAP user 107-1 may be assigned a role in the context of using a laptop computer, and the like, at an off-premises PSAP location to login during "normal" operation of the PSAP system 103 in a work-from-home context. However, such examples may further comprise retrieving the current load 141 and/or retrieving both the current load 141 and the historical load 151.

In these examples, the PSAP server 101 may determine a location of a client access device 105 authenticated at the block 302 via one or more of location data stored at the memory 160 (e.g., in an employee and/or volunteer record), via a network address of the client access device 105, and the like.

However, in some examples, the PSAP system 103 may go off-line due a power outage due to a natural disaster, and the like, which may include, but is not limited to, a lightning strike, a flood of the PSAP location, and the like. Similarly, the PSAP system 103 may go into a disaster recovery mode in which components thereof may be brought on-line in a staged manner and/or based on available power, and the like. In these examples, a current load 141 may not accurately indicate a number of calls that may be received and/or a number of client access devices 105, 115 that may shortly be available to handle calls and/or dispatching. Hence, in these examples, the controller 220 and/or the PSAP server 101 may retrieve the historical load 151 instead of the current load 141.

Furthermore, the historical load 151 that is retrieved may be for a given time period prior to the PSAP system 103 going off-line and/or entering the disaster recovery mode, for example to determine the load at the PSAP system 103 when the PSAP system 103 went off-line and/or entered the disaster recovery mode. Such a given time period may be for the 5 minutes or 10 minutes or 60 minutes prior to the PSAP system 103 going off-line and/or entering the disaster recovery mode, however any suitable given time period is within the scope of the present specification. In these examples, it is understood that the PSAP server 101, and/or another component of the PSAP system 103, and/or an historical load server, may be updating the historical load 151 on a real-time basis, such that the load at the PSAP system 103, when the PSAP system 103 went off-line and/or entered the disaster recovery mode, is available in the historical load 151.

Put another way, in these examples, the method 300 may further comprise the controller 220 and/or the PSAP server 101 determining that the PSAP system 103 has one or more of: gone off-line, and entered a disaster recovery mode, and the retrieving the PSAP load, at the block 304, may comprise retrieving the historical load 151 (e.g., the historical PSAP call-taking load and the historical PSAP first-responder-dispatching load) for a given time period prior to the PSAP system 103 one or more of: going off-line; and entering the disaster recovery mode.

Hence, in some of these examples, retrieving the PSAP load at the block 304 may comprise: retrieving the historical load 151 (e.g., the historical PSAP call-taking load and the historical PSAP first-responder-dispatching load), wherein the historical load 151 (e.g., the historical PSAP call-taking load and the historical first-responder-dispatching load) comprise respective historical averages over a plurality of prior measurements at one or more of: a local PSAP system (e.g., the PSAP system 103); and a remote PSAP system that shares attributes with the local PSAP system, as described above.

In some of these examples, on-premises client access devices, such as the client access device 105-2, and/or on-premises client access devices 115, may not be able to log back into the PSAP system 103 due to on-premises damage by a natural disaster, and hence a client access device 105, such as the client access device 105-1, that is authenticated at the block 302 may be located at an off-premises PSAP location. In a particular example, as described above, off-premises PSAP users 107 (e.g., and off-premises PSAP users 117) may be notified via separate messaging systems and devices (e.g., mobile phones, text messaging systems and the like) to login to the PSAP system 103 due to the natural disaster, and the like, for example, once the PSAP system 103 comes back online. Alternatively, off-premises PSAP users 107 (e.g., and off-premises PSAP users 117) may proactively login to the PSAP system 103, to assist with calls and dispatching for example when hearing about a natural disaster in media outlets (e.g., television, radio, internet sites), and the like.

The PSAP server 101 may determine that the PSAP system 103 has recently gone off-line and/or entered a disaster recovery mode by querying appropriate components of the PSAP system 103, determining that the PSAP server 101 has, itself, recently rebooted (e.g., due to the PSAP system 103 going offline), and the like.

In some examples, the controller 220 and/or the PSAP server 101, at the block 304, may retrieve both the current load 141 and the historical load 151 and compare the loads 141, 151, for example to determine whether the current load 141 is similar to, or different from, an average historical load at a current time and/or in a given time period before and/or after the current time, to predict changes to the current load 141 that may occur in the future.

At a block 306, the controller 220 and/or the PSAP server 101 assigns, based on the PSAP load determined at the block 304, a role to the PSAP user 107, the role comprising one of: a call-taking role; a first-responder-dispatching role; and a combined call-taking and first-responder-dispatching role, among other possibilities.

For example, assigning a role to the PSAP user 107 authenticated at the block 302 may be based on one or more of: a first number of other already-authenticated PSAP users 117 already assigned the call-taking role; and a second number of the other already-authenticated PSAP users 117 already assigned the first-responder-dispatching role.

For example, PSAP server 101 may determine that a given number of PSAP users 117 are presently assigned to a call-taking role, another given number of PSAP users 117 are presently assigned to a first-responder-dispatching role, and yet a further given number of PSAP users 117 are presently assigned to a combined role. The load (e.g., current and/or historical load) retrieved at the block 304 may indicate that more PSAP users in a call-taking role may be needed, or that more PSAP users in a first-responder-dispatching role may be needed or that both roles may be needed. As such, the PSAP server 101 may assign a role to the PSAP user 107 authenticated at the block 302 accordingly, which generally provides load balancing at the PSAP system 103.

However, when the PSAP system 103 was off-line and/or has entered a disaster recovery mode, the historical load 151 may indicate predicted need for PSAP users in the various roles, and the PSAP server 101 may accordingly assign a role to the PSAP user 107 authenticated at the block 302.

In yet further examples, the controller 220 and/or the PSAP server 101 may assign a role to the PSAP user 107, authenticated at the block 302, further based on one or more of: a skill of the PSAP user 107, as stored at a memory, and hardware resources available to the PSAP user 107, as stored at the memory. For example, the data 161 indicating the skills of the PSAP user 107 and/or hardware resources available to the PSAP user 107 may be retrieved from the memory 160. Hence, for example, when the PSAP user 107 has experience and/or skills in call-taking (e.g., in a natural disaster or during normal operations of the PSAP system 103 and/or for given incident types), and/or a respective client access device 105 is more suitable for call-taking than dispatching, then the PSAP user 107 may be assigned a call-taking role. Similarly, when the PSAP user 107 has experience and/or skills in dispatching (e.g., in a natural disaster or during normal operations of the PSAP system 103 and/or for given incident types), and/or a respective client access device 105 is more suitable for dispatching than call-taking, then the PSAP user 107 may be assigned a dispatching role. Furthermore, the PSAP load may indicate a given incident type is occurring (e.g., more frequently than other incident types); and, when a given PSAP user 107 has experience with the given incident type in call-taking or dispatching (or both), a corresponding role may be accordingly assigned to the PSAP user 107.

In examples where the PSAP server 101 has access to third party data, such as traffic data, disaster data, weather data, and the like, such third party data may be used, in combination with the current load 141 and/or the historical load 151 and/or the data 161 to assign a role to the PSAP user 107. For example, traffic data, disaster data, weather data may be used to predict when given incident types (e.g., traffic incidents, earthquakes, fires, storms) may occur, and skills of the PSAP user 107 with regards to such given incident types may be used to assign a role to the PSAP user 107.

However, assigning a role to the PSAP user 107 is understood to be primarily based on the PSAP load determined at the block 304, with skills and/or hardware resources and/or third party data used as a secondary factor when assigning a role to a PSAP user 107. For example, when there is a need for PSAP users in a call-taking role, as determined from the PSAP load at the block 304, but the PSAP user 107 has more skills in dispatching (e.g., and/or with dispatching of given incident types that may occur), the controller 220 and/or the PSAP server 101 may assign the call-taking role to the PSAP user 107 and/or a combined call-taking and dispatching role.

At a block 308, the controller 220 and/or the PSAP server 101 serves, to the client access device 105, based on the role assigned to the PSAP user 107, a corresponding interface 171 to one of: the call-taking application 109-1; the first-responder-dispatching application 109-2; and the combined call-taking and first-responder-dispatching application 109-3, among other possibilities.

For example, when a PSAP user 107 is assigned a call-taking role, the respective client access device 105 is served the corresponding call-taking interface 171-1 to interact with the call-taking application 109-1. As described above, the corresponding interface 171-1 to the call-taking application 109-1 may include one or more of: a mechanism for answering emergency 911 calls; and a data entry mechanism for generating new incidents, and the like.

Similarly, when a PSAP user 107 is assigned a dispatching role, the respective client access device 105 is served the corresponding dispatching interface 171-2 to interact with the dispatching application 109-2. As described above, the corresponding interface 171-2 to the dispatching application 109-2 may include one or more of: a radio console interface for contacting the first responders 137; and a map application for identifying locations of one or more of the first responders 137 and the callers 127 to the PSAP system 103.

Similarly, when a PSAP user 107 is assigned a combined role, the respective client access device 105 is served the corresponding combined interface 171-3 to interact with the combined application 109-3. As described above, the corresponding interface 171-3 to the combined application 109-3 may include: one or more of: a mechanism for answering emergency 911 calls; and a data entry mechanism for generating new incidents; and one or more of: a radio console interface for contacting the first responders 137; and a map application for identifying locations of one or more of the first responders 137 and the callers 127 to the PSAP system 103.

In examples where the client access devices 105 store local copies of the interfaces 171, at the block 308, the controller 220 and/or the PSAP server 101 may serve a corresponding interface 171 to the client access device 105 by transmitting data to the client access 105 which indicates which interface 171 is be retrieved from a local memory and provided at a respective display screen at the client access device 105.

Figure 4:
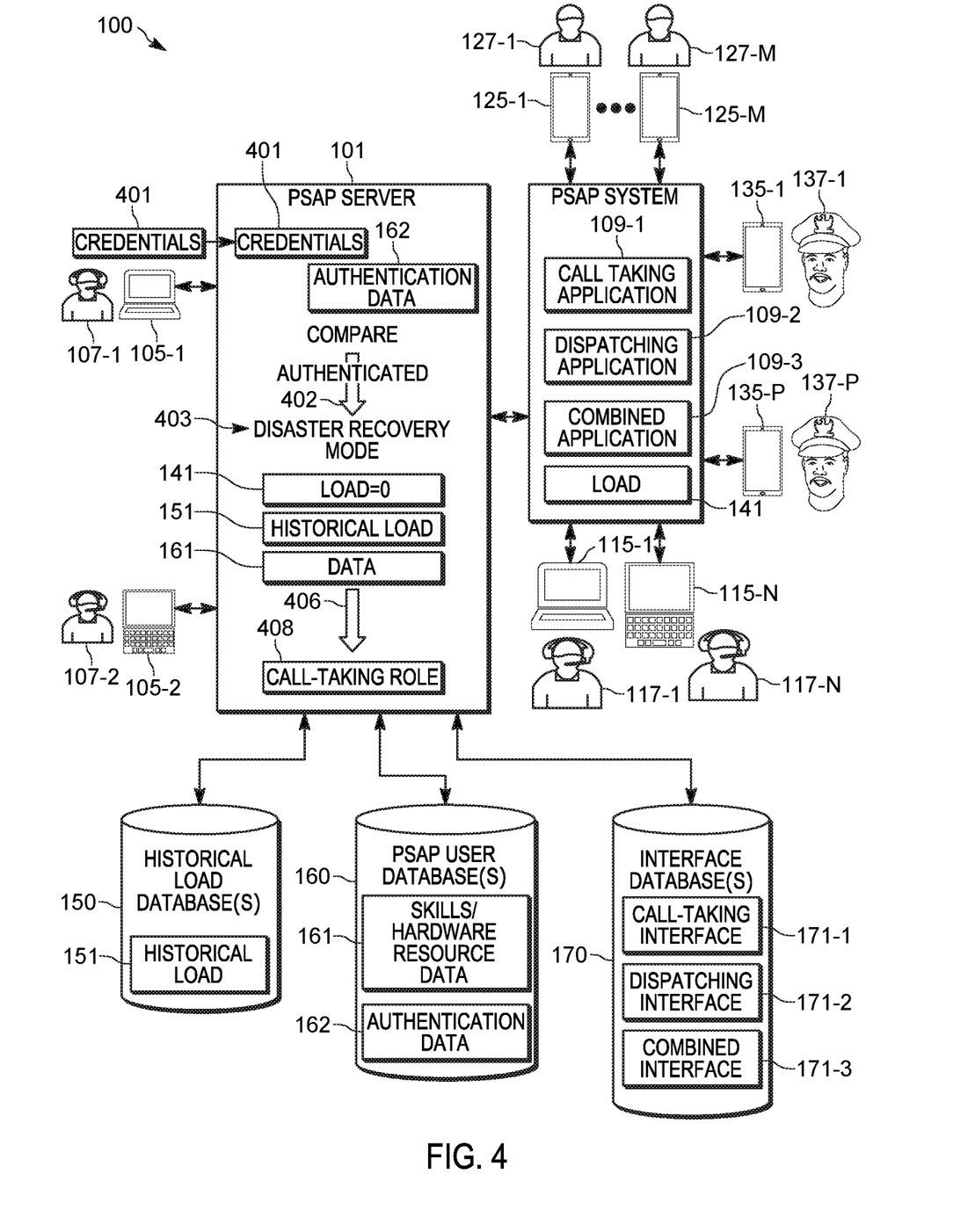
FIG. 4 depicts an example of a method for serving interfaces to client access devices based on assigned roles implemented in the system of FIG. 1, in accordance with some examples.
Figure 5:
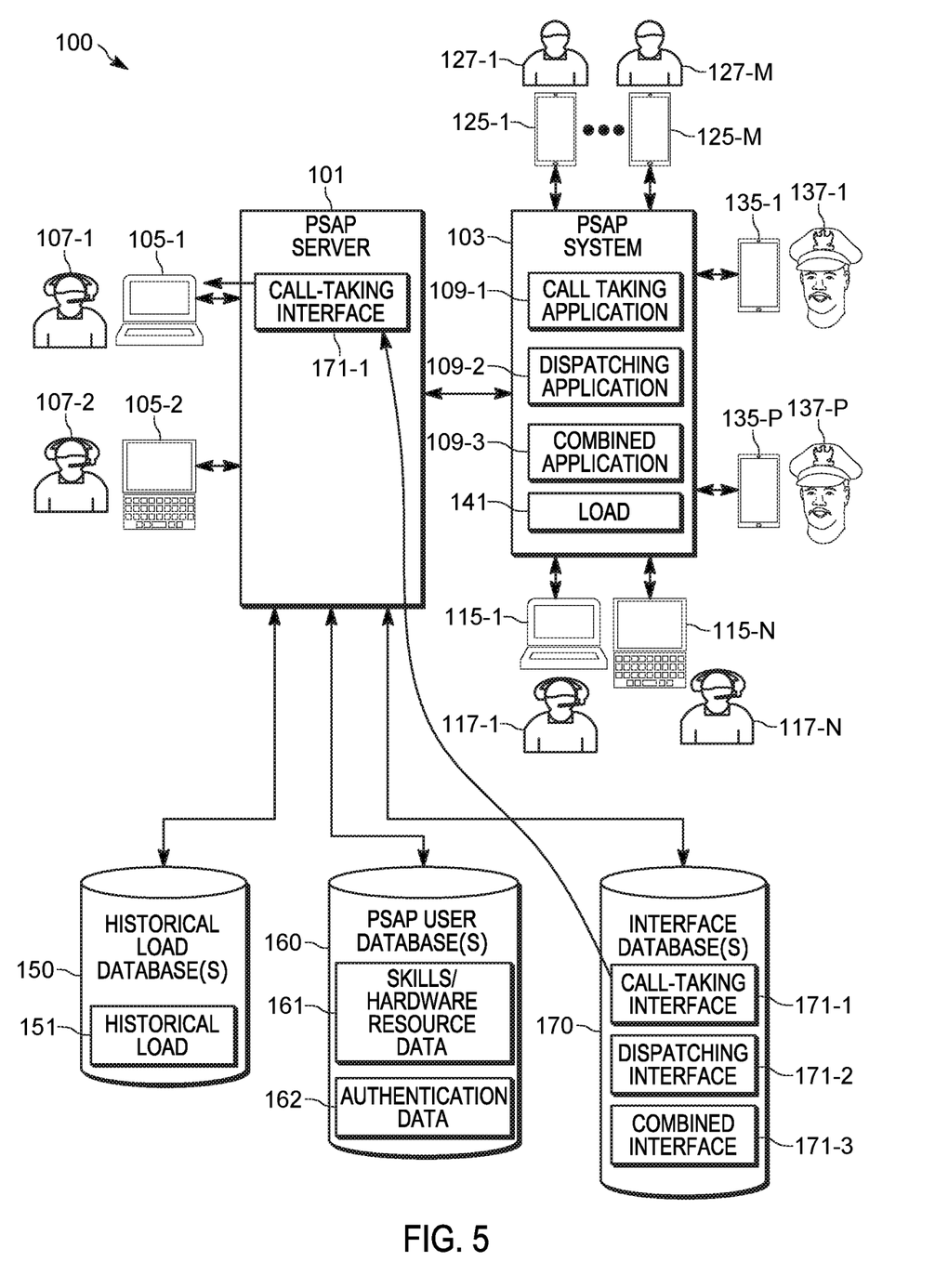
FIG. 5 depicts further aspects of the method for serving interfaces to client access devices based on assigned roles implemented in the system of FIG. 1, in accordance with some examples.

Attention is next directed to FIG. 4 and FIG. 5, which are substantially similar to FIG. 1, with like components having like numbers, and show the system 100 implementing the method 300 with respect to the PSAP user 107-1 being assigned a role and the client access device 105-1 being served an interface 171 when the PSAP system 103 is in a disaster recovery mode, as described hereafter.

For example, with attention first directed to FIG. 4, the PSAP user 107-1 has operated the client access device 105-1 to authenticate with the PSAP system 103, for example, as depicted, by transmitting credentials 401 to the PSAP server 101 via a respective communication link. As depicted, the PSAP server 101 performs an authentication by comparing the credentials 401 against authentication data 162 for the PSAP user 107-1, as retrieved from the memory 160. As depicted, the PSAP user 107-1 is authenticated as indicated by the arrow 402, indicating, for example, that the credentials 401 match the authentication data 162 for the PSAP user 107-1. As previously described, the authentication may alternatively be performed by another component of the PSAP system 100. Regardless, the PSAP server 101 detects (e.g., at the block 302 of the method 300) that the PSAP user 107-1 is authenticated.

As depicted, the PSAP server 101 further determines that the PSAP system 103 is in a disaster recover mode. For example, the PSAP server 101 may query suitable components of the PSAP server 103 as to current state of the PSAP system 103, which may return data 403 indicative of the PSAP system 103 being in a disaster recovery mode.

As such, the PSAP server 101 retrieves (e.g., at the block 304 of the method 300) the historical load 151, as well as the data 161. However, as depicted, the PSAP server 101 may also retrieve the current load 141, which, as depicted, indicates that the current load 141 is "0" and hence not representative of a predicted load on the PSAP system 103. Hence, the PSAP server 101 may ignore the current load 141 and, from the historical load 151, the PSAP server 101 assigns (e.g., at the block 306 of the method 300), as indicated by the arrow 406, a call-taking role 408 to the PSAP user 107-1.

For example, the historical load 151 may indicate that there are historically not enough PSAP users 117 in a call-taking role at the PSAP system 103 at the current time and/or prior to the PSAP system 103 entering the disaster recovery mode, there not enough PSAP users 117 in a call-taking role at the PSAP system 103. As such, the PSAP user 107-1 is assigned the call-taking role 408.

With attention next directed to FIG. 5, the PSAP server 101 serves (e.g., at the block 308 of the method 300) the interface 171-1, to the call-taking application 109-1, to the client access device 105-1, for example by retrieving the interface 171-1 from the memory 170 and transmitting the interface 171-1 to the client access device 105-1. While not depicted, thereafter, the client access device 105-1 may act as a client access device available to receive calls at the PSAP system 103, similar to call-taking client access devices 115.

It is further understood that, in examples where the PSAP server 101 assigns a dispatching role to the PSAP user 107-1, the PSAP server 101 serves (e.g., at the block 308 of the method 300) the interface 171-2, to the dispatching application 109-2, to the client access device 105-1. Similarly, in examples where the PSAP server 101 assigns a combined role to the PSAP user 107-1, the PSAP server 101 serves (e.g., at the block 308 of the method 300) the interface 171-3 to the combined application 109-3 to the client access device 105-1.

It is further understood that, when the client access device 105-2, and/or other client access devices 115 attempt to login to the PSAP system 103 and/or authenticate with the PSAP system 103, for example when the PSAP system 103 comes back on-line in the disaster recovery mode, the client access device 105-2, and/or other client access devices 115 may be assigned a role, and served a corresponding interface 171, in a similar manner.

Figure 6:
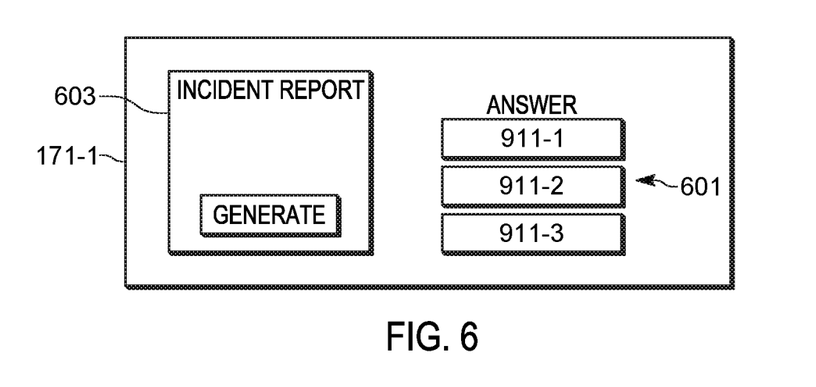
FIG. 6 depicts an example interface to a call-taking application, in accordance with some examples.
Figure 7:
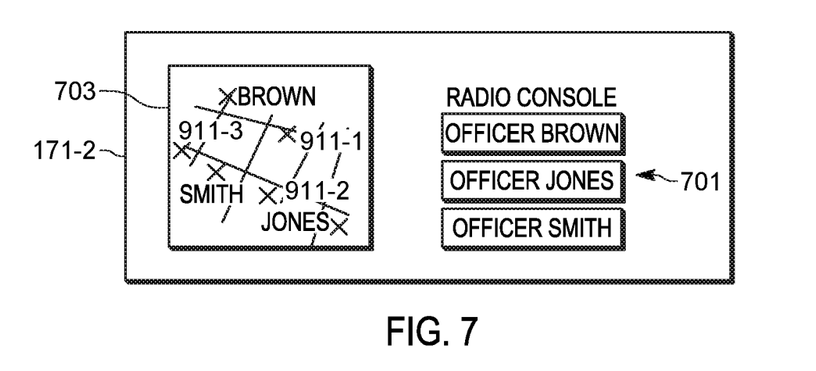
FIG. 7 depicts an example interface to a first-responder dispatching application, in accordance with some examples.
Figure 8:
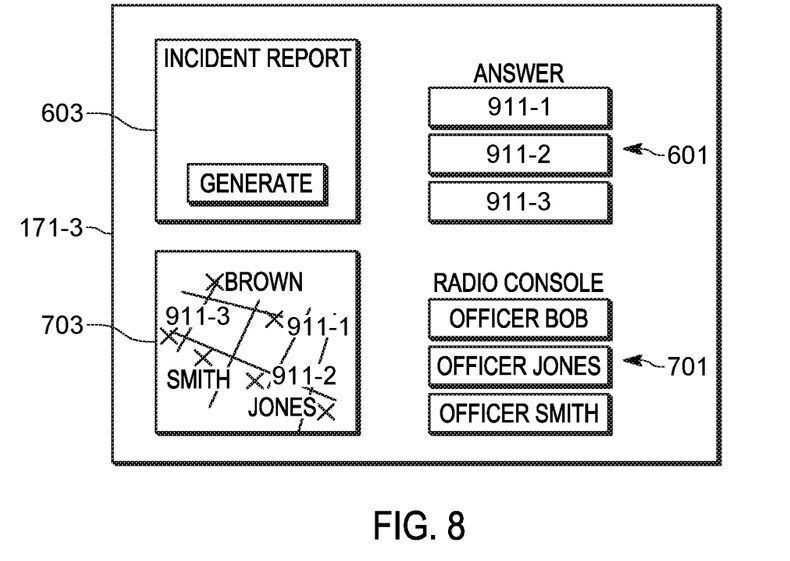
FIG. 8 depicts an example interface to a combined call-taking and first-responder dispatching application, in accordance with some examples.

Attention is next directed to FIG. 6, FIG. 7 and FIG. 8, which respectively show examples of the interfaces 171-1, 171-2, 171-3. It is understood that the depicted interfaces 171 are merely simplistic examples showing basic functionality provided by the interfaces 171.

As depicted in FIG. 6, the interface 171-1 to the call-taking application 109-1 may comprise a mechanism 601 for answering emergency 911 calls for example, as depicted electronic soft buttons for answering calls from the communication devices 125 that may be in a queue. For example, as depicted, the mechanism 601 includes three electronic soft buttons for respectively answering three respective 911 calls in a queue. As also depicted in FIG. 6, the interface 171-1 to the call-taking application 109-1 may comprise a data entry mechanism 603 for generating new incidents and/or incident reports. For example, as depicted, the data entry mechanism 603 includes a text box at which information for an incident reported on a 911 call, and the like, may be entered, and an electronic soft button, labelled "Generate", for generating a new incident based on the text entered.

As depicted in FIG. 7, the interface 171-2 to the dispatching application 109-2 may comprise a radio console interface 701 for contacting first responders. For example, as depicted, the radio console interface 701 comprises electronic soft buttons for initiating radio calls to various first responders 137 (e.g., Officers "Brown", "Jones" and "Smith"); however, the radio console interface 701 may include any suitable combination of electronic soft buttons for controlling radio communications with the communication devices 135 of the first responders 137 including, but not limited to, talkgroup and/or push-to-talk (PTT) controls which may be to communicate with a plurality of the first responders 137, via the communication devices 135, in a single talkgroup at a same time. As also depicted in FIG. 7, the interface 171-2 to the dispatching application 109-2 may comprise a map application 703 for identifying locations of one or more of the first responders 137 and the callers 127 to the PSAP system 103. For example, as depicted, the map application 703 includes a street map showing locations at which the first responders 137 are located (e.g., as received from location determining devices at the communication devices 135), as well as locations of the callers 127 who made the 911 calls represented by the mechanism 601 (e.g., as determined using device-based hybrid location systems, and the like, which may be deployed in the PSAP system 103).

As depicted in FIG. 8, the interface 171-3 to the combined application 109-3 comprises the mechanism 601 for answering emergency 911 calls, the data entry mechanism 603 for generating new incidents and/or incident reports, the radio console interface 701 and the map application 703.

It is understood, however, that the mechanism 601 for answering emergency 911 calls, the data entry mechanism 603 for generating new incidents and/or incident reports, the radio console interface 701 and the map application 703 may be provided at the interfaces 171 in any suitable format and/or with any other suitable features. For example, the interfaces 171 may include electronic soft buttons, and the like, for transferring calls, texting with the callers 127 and/or the first responders 137, windows showing queues of emergency 911 calls, windows showing in-progress emergency 911 calls, directories, and/or any other suitable feature.

As should be apparent from this detailed description above, the operations and functions of computing devices described herein are sufficiently complex as to require their implementation on a computer system, and cannot be performed, as a practical matter, in the human mind. Computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
   detecting, at a public safety answering point (PSAP) server, an authentication of a PSAP user via a client access device;
   retrieving, by the PSAP server, a PSAP load comprising one or more of:
      a current PSAP call-taking load and a current PSAP first-responder-dispatching load; and
      an historical PSAP call-taking load and an historical PSAP first-responder-dispatching load;
   assigning, by the PSAP server, based on the PSAP load, a role to the PSAP user, the role comprising one of: a call-taking role; a first-responder-dispatching role; and a combined call-taking and first-responder-dispatching role; and
   serving, by the PSAP server, to the client access device, based on the role assigned to the PSAP user, a corresponding interface to one of: a call-taking application; a first-responder-dispatching application; and a combined call-taking and first-responder-dispatching application.

2. The method of claim 1, wherein:
   the client access device is located at an on-premises PSAP location; and
   the retrieving the PSAP load comprises retrieving the current PSAP call-taking load and the current PSAP first-responder-dispatching load.

3. The method of claim 1, further comprising:
   determining that a PSAP system has one or more of: gone off-line, and entered a disaster recovery mode, and
   wherein the retrieving the PSAP load comprises retrieving the historical PSAP call-taking load and the historical PSAP first-responder-dispatching load for a given time period prior to the PSAP system one or more of: going off-line; and entering the disaster recovery mode.

4. The method of claim 3, wherein the client access device is located at an off-premises PSAP location.

5. The method of claim 1, wherein the retrieving the PSAP load comprises:
   retrieving the historical PSAP call-taking load and the historical PSAP first-responder-dispatching load, and
   wherein the historical PSAP call-taking load and the historical PSAP first-responder-dispatching load comprise respective historical averages over a plurality of prior measurements at one or more of: a local PSAP system; and a remote PSAP system that shares attributes with the local PSAP system.

6. The method of claim 1, wherein the assigning the role to the PSAP user is further based on one or more of:
   a skill of the PSAP user, as stored at one or more memories; and
   hardware resources available to the PSAP user, as stored at one or more memories.

7. The method of claim 1, wherein the assigning the role to the PSAP user is further based on one or more of:
   a first number of other already-authenticated PSAP users already assigned the call-taking role; and
   a second number of the other already-authenticated PSAP users already assigned the first-responder-dispatching role.

8. The method of claim 1, wherein the corresponding interface to the call-taking application includes one or more of: a mechanism for answering emergency 911 calls; and a data entry mechanism for generating new incidents.

9. The method of claim 1, wherein the corresponding interface to the first-responder-dispatching application includes one or more of: a radio console interface for contacting first responders; and a map application for identifying locations of one or more of the first responders and callers to a PSAP system.

10. The method of claim 1, wherein the corresponding interface to the combined call-taking and first-responder-dispatching application includes:
    one or more of: a mechanism for answering emergency 911 calls; and a data entry mechanism for generating new incidents; and
    one or more of: a radio console interface for contacting first responders; and a map application for identifying locations of one or more of the first responders and callers to a PSAP system.

11. A device comprising:
    a communication unit;
    a controller having access to one or more memories, the controller configured to:
      detect an authentication of a PSAP user via a client access device;
      retrieve a PSAP load comprising one or more of: a current PSAP call-taking load and a current PSAP first-responder-dispatching load; and an historical PSAP call-taking load and an historical PSAP first-responder-dispatching load, as stored at the one or more memories;
      assign, based on the PSAP load, a role to the PSAP user, the role comprising one of: a call-taking role; a first-responder-dispatching role; and a combined call-taking and first-responder-dispatching role; and
      serve, via the communication unit, to the client access device, based on the role assigned to the PSAP user, a corresponding interface to one of: a call-taking application; a first-responder-dispatching application; and a combined call-taking and first-responder-dispatching application.

12. The device of claim 11, wherein:
    the client access device is located at an on-premises PSAP location; and
    the controller is further configured to retrieve the PSAP load by: retrieving the current PSAP call-taking load and the current PSAP first-responder-dispatching load.

13. The device of claim 11, wherein the controller is further configured to:
    determine that a PSAP system has one or more of: gone off-line, and entered a disaster recovery mode, and
    retrieve the PSAP load by retrieving the historical PSAP call-taking load and the historical PSAP first-responder-dispatching load for a given time period prior to the PSAP system one or more of: going off-line; and entering the disaster recovery mode.

14. The device of claim 13, wherein the client access device is located at an off-premises PSAP location.

15. The device of claim 11, wherein the controller is further configured to retrieve the PSAP load by:
    retrieving the historical PSAP call-taking load and the historical PSAP first-responder-dispatching load, and
    wherein the historical PSAP call-taking load and the historical PSAP first-responder-dispatching load comprise respective historical averages over a plurality of prior measurements at one or more of: a local PSAP system; and a remote PSAP system that shares attributes with the local PSAP system.

16. The device of claim 11, wherein the controller is further configured to assign the role to the PSAP user further based on one or more of:
    a skill of the PSAP user, as stored at the one or more memories; and
    hardware resources available to the PSAP user, as stored at the one or more memories.

17. The device of claim 11, wherein the controller is further configured to assign the role to the PSAP user further based on one or more of:
    a first number of other already-authenticated PSAP users already assigned the call-taking role; and
    a second number of the other already-authenticated PSAP users already assigned the first-responder-dispatching role.

18. The device of claim 11, wherein the corresponding interface to the call-taking application includes one or more of: a mechanism for answering emergency 911 calls;
    and a data entry mechanism for generating new incidents.

19. The device of claim 11, wherein the corresponding interface to the first-responder-dispatching application includes one or more of: a radio console interface for contacting first responders; and a map application for identifying locations of one or more of the first responders and callers to a PSAP system.

20. The device of claim 11, wherein the corresponding interface to the combined call-taking and first-responder-dispatching application includes:
    one or more of: a mechanism for answering emergency 911 calls; and a data entry mechanism for generating new incidents; and
    one or more of: a radio console interface for contacting first responders; and a map application for identifying locations of one or more of the first responders and callers to a PSAP system.

* * * * *